United States Patent
Gosetti (10) Patent No.: US 6,207,095 B1
(45) Date of Patent: Mar. 27, 2001

(54) PROCESS FOR MANUFACTURING MULTI-LAYERED CORES

(75) Inventor: Steven M. Gosetti, Providence, RI (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 09/146,553

(22) Filed: Sep. 3, 1998

(51) Int. Cl.[7] .................................................. B29C 43/18
(52) U.S. Cl. ..................... 264/250; 264/275; 264/279.1; 264/320
(58) Field of Search ............................ 264/250, 254, 264/320, 275, 279.1

(56) References Cited

U.S. PATENT DOCUMENTS

| | | | |
|---|---|---|---|
| 2,354,017 | 7/1944 | Hazell | 154/18 |
| 3,130,102 | * 4/1964 | Watson et al. | 156/228 |
| 3,784,209 | 1/1974 | Berman et al. | 273/218 |
| 3,989,568 | 11/1976 | Isaac | 156/182 |
| 4,065,537 | 12/1977 | Miller et al. | 264/143 |
| 4,229,401 | 10/1980 | Pocklington | 264/248 |
| 4,625,964 | 12/1986 | Yamada | 273/62 |
| 4,653,758 | 3/1987 | Solheim | 273/232 |
| 4,714,253 | 12/1987 | Nakahara et al. | 273/228 |
| 4,848,770 | 7/1989 | Shama | 273/228 |
| 4,863,167 | 9/1989 | Matsuki et al. | 273/62 |
| 4,919,434 | 4/1990 | Saito | 273/235 |
| 5,002,281 | 3/1991 | Nakahara et al. | 273/220 |
| 5,006,297 | 4/1991 | Brown et al. | 264/234 |
| 5,072,944 | 12/1991 | Nakahara et al. | 273/220 |
| 5,184,828 | 2/1993 | Kim et al. | 273/228 |
| 5,253,871 | 10/1993 | Viollaz | 273/228 |
| 5,314,187 | 5/1994 | Proudfit | 273/235 |
| 5,559,188 | 9/1996 | Egashira et al. | 525/74 |
| 5,586,950 | 12/1996 | Endo | 473/356 |
| 5,688,191 | 11/1997 | Cavallaro et al. | 473/373 |

FOREIGN PATENT DOCUMENTS

| | | |
|---|---|---|
| 28623/97 | * 1/1998 | (AU) . |
| 1087901 | 10/1967 | (GB) . |

* cited by examiner

*Primary Examiner*—Jan H. Silbaugh
*Assistant Examiner*—Edmund H. Lee
(74) *Attorney, Agent, or Firm*—Pennie & Edmonds LLP (57) ABSTRACT

The present invention provides a method of forming a multi-layered core, particularly a multi-layered core for a golf ball, that provides improved centering of the golf ball center within the core, while allowing existing formulations to be used. The method includes heating the core material, molding it to form hemispherical shells, cooling the hemispherical shells, and assembling two hemispherical shells around a golf ball center to form a multi-layered core. The increased rigidity of the shells resulting from cooling them allows the use of existing core formulations while improving the centering of the golf ball center.

25 Claims, 6 Drawing Sheets

PROCESS FOR MANUFACTURING MULTI-LAYERED CORES

FIELD OF INVENTION

This invention relates generally to a process for manufacturing a golf ball core, and more specifically, to a process for manufacturing a multi-layered golf ball core wherein hemispherical shells are stiffened by cooling prior to being joined around a spherical core to form a multi-layered core. The process enables the manufacture of multi-layered cores with improved centering characteristics, using existing thermoset core formulations.

BACKGROUND

Golf ball cores, whether single-piece cores or multi-layered cores, can be manufactured by a variety of conventional processes, including compression molding and injection molding. The golf balls which incorporate the cores can be divided into several general types or groups: two-piece balls, wound (or three-piece) balls, and balls with multi-layered cores and/or multi-layered covers.

Two-piece golf balls are generally most popular with the average recreational golfer because they provide a very durable ball while also providing maximum distance. These balls contain a solid core, typically made of crosslinked polybutadiene, and a cover, typically made of a tough, cut-proof ionomer resin, such as SURLYN® (DuPont). The combination of the core and cover materials provides a "hard" ball that is virtually indestructible by golfers. Further, such a combination imparts a high initial velocity to the ball, which results in improved distance. Because these materials are very rigid, two-piece balls have a hard "feel" when struck with a club. Likewise, due to their hardness, these balls have a relatively low spin rate, which provides greater distance, but also makes them difficult to control, particularly on shorter approach shots. Because of their simple, two-piece structure, these balls are relatively easy to manufacture using well-known, conventional methods.

Three-piece balls, or wound balls, are the preferred balls of more advanced players, due to their spin and feel characteristics. Wound balls typically have either a solid rubber or liquid center core around which many yards of a stretched elastic thread or yarn are wound. The wound core is then covered with a durable cover material, such as SURLYN® or a similar material, or a softer cover such as Balata or polyurethane. Wound balls are generally softer and provide more spin, which enables a skilled golfer to have more control over the ball's flight and final position. However, wound, higher-spinning balls typically provide a shorter distance compared to two-piece balls. Moreover, as a result of their more complex structure, wound balls generally require a longer time to manufacture and are more expensive to produce than two-piece balls.

A number of patents are directed towards modifying the properties of conventional non-wound balls by altering the typical single layer core and single layer cover construction to provide a multi-layered ball. These patents are generally directed towards improving a variety of golf ball characteristics by altering the physical and chemical properties of the different layers.

For example, several patents are directed towards improving the carry distance of the ball. U.S. Pat. No. 4,863,167 relates to a multi-layered golf ball having improved rebound characteristics in order to increase its flight distance. The improved characteristics are provided by including a filler in an outer layer so as to impart a higher specific gravity to the outer layer than that of an inner layer. The outer layer is formed using conventional compression or injection molding methods.

Similarly, U.S. Pat. No. 5,184,828 relates to a multi-layered golf ball having improved rebound characteristics and carry distance while maintaining an adequate spin rate. These characteristics are obtained by controlling the size of core inner and outer layers as well as their specific gravity and hardness. While the reference is explicit about the ball characteristics, it does not teach in detail how the outer layer is formed, but indicates only that the outer layer is compression or injection molded around the center.

Additionally, there are a number of patents directed towards improving the spin, click and feel of solid balls while maintaining the distance provided by the solid construction. For example, U.S. Pat. No. 5,072,944 discloses a multi-layered golf ball having a center and outer layer having particular hardness values. With regard to the manufacturing method, however, this reference only discloses that the outer layer is "concentrically molded" on the center core. Other patents, such as U.S. Pat. Nos. 4,848,770, 5,253,871 and 5,688,191 modify the properties of the ball by adjusting factors such as the number of layers, their thickness, and their chemical composition. While these golf balls offer improved characteristics, their manufacturing methods are conventional.

Several patents are directed to improved manufacturing processes. For example, U.S. Pat. No. 5,006,297 discloses a method in which partially cured polyurethane half-shells are formed, enclosed around a center in a fixed-pin mold, intermediately cured, then compression molded to form a finished golf ball. This method, however, is not generally applicable to forming multi-layered cores of different formulations.

U.S. Pat. No. 5,314,187 discloses a method in which an inner cover layer is molded around a core, either by injection molding around the core, or by injection molding two half shells and compression molding the half shells around the core. U.S. Pat. No. 5,586,950 discloses a similar method. However, both of these patents concern inner cover layers, which are thermoplastic materials and which are able to be remolded as a result.

What is seen from these various references is that much attention has been directed to improving the physical properties of golf balls by adjusting such factors as the number and size of layers, the chemical composition of the different layers, the degree of chemical crosslinking and the different densities of the layers. Although multi-layered cores can provide new and improved characteristics to the resulting golf balls, they introduce new demands on the manufacturing process. However, relatively little attention has been directed to improving the manufacturing processes which are used. Those references which do teach manufacturing processes fail to teach processes which can improve the properties of multi-layered cores using a variety of core formulations.

Multiple outer layers are conventionally formed around a golf ball center by a variety of methods, including compression molding or injection molding a spherical shell layer around the center. Each of these manufacturing methods suffers from several disadvantages. Injection molding of the shells around the golf ball center is expensive, because of higher capital costs associated with the more complex manufacturing process, and further can introduce defects into the core due to the penetration by the pins. Moreover, injection molding does not generally work well with thermoset materials. Alternatively, the method of forming hemispherical shells first and then compression molding them around a golf ball center avoids pin defects. This method generally works well with thermoplastic materials. However, the method of forming shells and compression molding them over a core is not generally contemplated with thermoset materials, which lack sufficient rigidity for forming before being cured, and which cannot be reformed after being cured. Thus, the multi-layered cores formed today generally have poor concentricity between the center and outer layers, which adversely affects playing characteristics.

Thus, there remains a need for improved methods of forming multi-layered cores utilizing a variety of core formulations and producing golf ball cores with improved centering characteristics.

SUMMARY OF THE INVENTION

The present invention relates to a method of forming a multi-layered golf ball core. More particularly, the invention is directed to an improved method for forming a multi-layered core that provides improved centering of the ball center within the core, while allowing existing core materials and formulations, including thermoset formulations, to be used. The method comprises providing a ball center for the core and then joining an outer layer of hemispherical shells around the center. The hemispherical shells are formed by heating a core material to a temperature high enough that the material is pliable; shaping the core material to form hemispherical shells; and cooling the hemispherical shells so that the core material stiffens. Once the cooled hemispherical shells are formed, a complete multi-layered core can be formed by assembling two hemispherical shells around a ball center and joining the shells to form a multi-layered core.

It has been found that in order to form better multi-layered golf ball cores with a thermoset core material outer layer, hemispherical shells should be formed, and then the shells joined together around a spherical core. Cooling the hemispherical shells after shaping them provides increased rigidity so that the hemispherical shape is better maintained during subsequent processing, thus resulting in improved centering characteristics. The increased rigidity of the shells achieved by cooling allows the use of existing thermoset core formulations that would otherwise lack sufficient rigidity unless cured. Then, the hemispherical shells of uncured thermoset material can be cured around a ball center to form a multi-layered core with improved centering of the ball center.

As set forth in more detail below, thermoset core formulations generally have a cure initiation temperature of greater than 220° F. However, core materials are very pliable and have a Mooney viscosity of less than 28 Mooney units when heated to about 180 to 220° F. Thus, when made pliable by heating to a temperature of about 180 to 220° F., a thermoset core material can be easily shaped and formed, but the curing (cross-linking) is not initiated. More importantly, it has been determined that core materials have sufficient rigidity, i.e., they have a viscosity of greater than about 500,000 poise, or a stiffness of at least about $2.6 \times 10^6$ dyne/cm$^2$, when stiffened by cooling to a temperature about 45° F. The rigidity further increases at lower temperatures. Therefore, the core material can be handled as hemispherical shells, if desired, and assembled around centers without deforming when the hemispherical shells are maintained at or below a temperature of about 45° F.

DETAILED DESCRIPTION OF THE INVENTION

Figure 1:
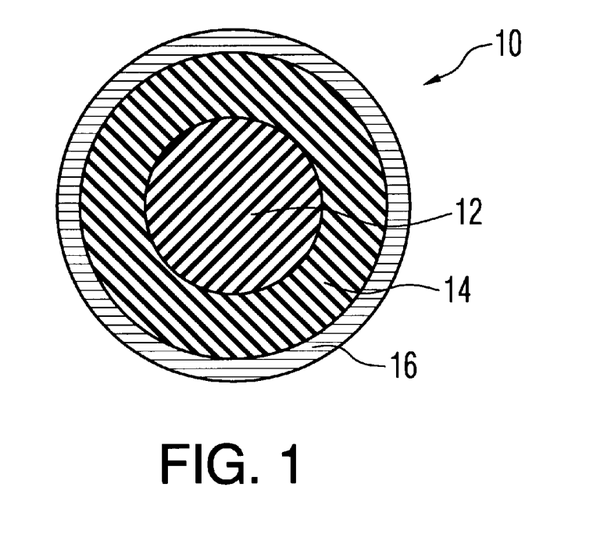
FIG. 1 is a cross-section of a golf ball according to the present invention.

The present invention is an improved method for forming a multi-layered core for a golf ball. Referring to FIG. 1, a golf ball 10 having a multi-layered core includes a ball center 12, at least one core outer layer 14, and a cover 16. The ball center 12 and the core outer layer 14 together comprise the multi-layered core of the ball.

As discussed in detail below, the ball center 12 can be a solid sphere or a fluid filled shell; the core outer layer 14 can be any existing core formulation and is generally a polybutadiene-based material; and the cover 16 can be one or more layers and is preferably comprised of an ionomer resin or ionomer resin blend, but can be any material that provides durability and resiliency for a golf ball.

Figure 2:
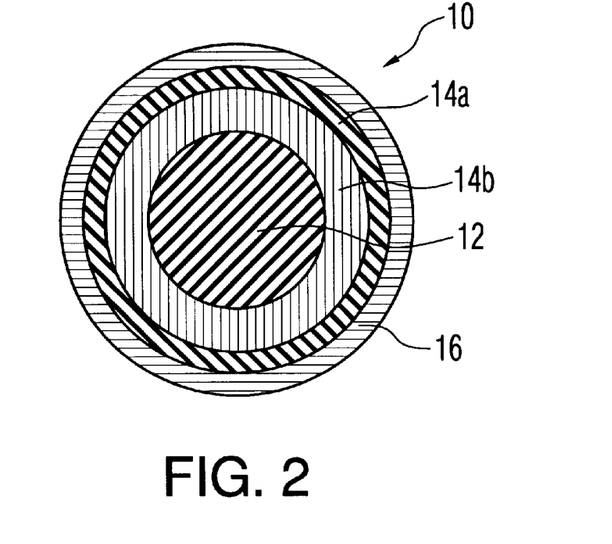
FIG. 2 is a cross-section of another golf ball according to the present invention.

The core outer layer 14 may comprise a plurality of layers. FIG. 2 shows a golf ball 10 having a ball center 12, two core outer layers 14a and 14b, and a cover 16. More than two core outer layers may also be used, but only two are shown in the figure. The ball center 12 and the core outer layers such as 14a and 14b, and any additional core outer layers, together comprise the multi-layered core of the ball.

Figure 3:
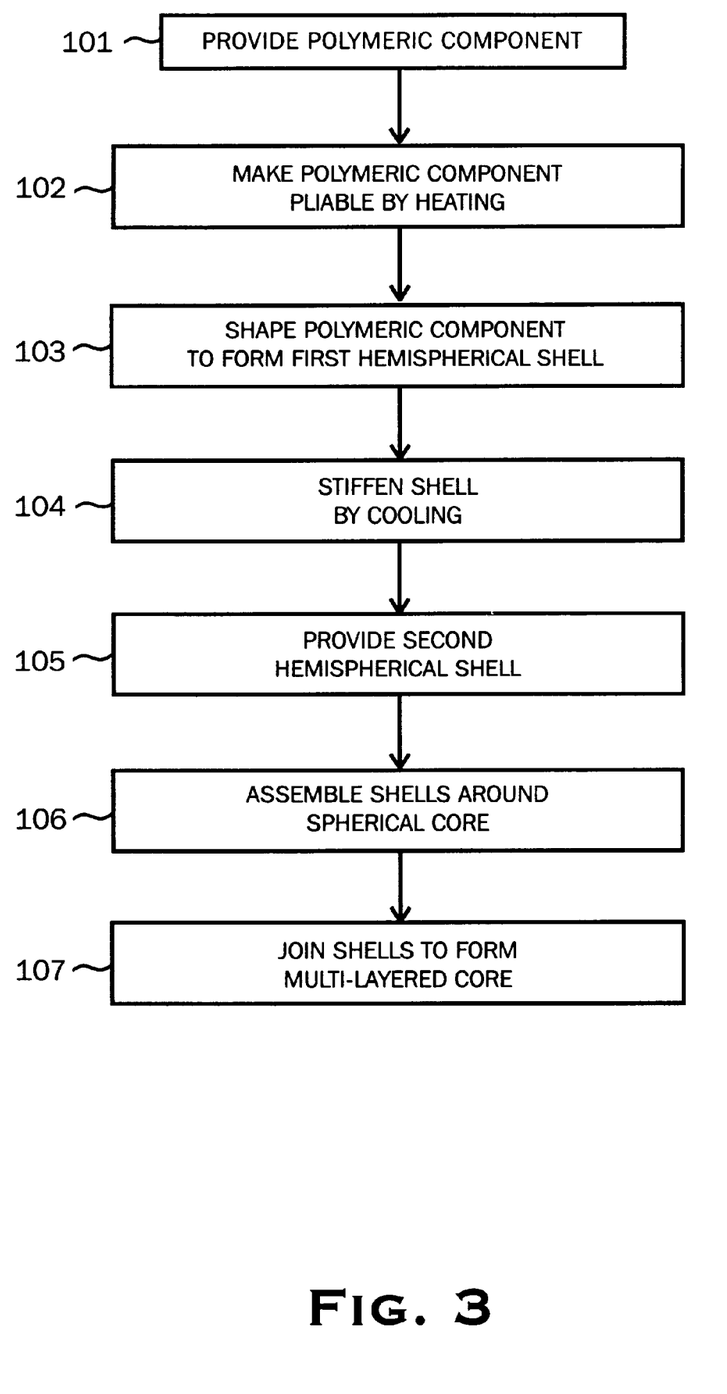
FIG. 3 is a flow diagram of a process for forming a multi-layered core according to the present invention.

Referring now to FIG. 3, the present invention is directed toward a method of making a multi-layered core with improved centering characteristics. According to the present method, a multi-layered core is formed by: providing 101 a polymeric component; making the polymeric component pliable 102 by heating; shaping 103 the polymeric component to form a first hemispherical shell; stiffening 104 the first shell by cooling; providing 105 a second hemispherical shell; assembling 106 the two shells around a spherical core; and joining 107 the two shells to form a multi-layered core.

In step 101, a polymeric component is provided as a core outer layer material. The polymeric component can be any formulation suitable for producing a golf ball core, including thermoplastic and thermoset formulations. Preferably, a thermoset formulation is used, and the polymeric component comprises a polymer, a cross-linking agent, and a radical initiator.

A wide variety of suitable polymers is known in the art. For example, suitable polymers include polybutadiene, natural rubber, styrene butadiene, and isoprene. A preferred polymer is polybutadiene, and particularly preferred is 1,4-polybutadiene having a cis-1,4 content of at least about 90% and more preferably above about 96%. Commercial sources of polybutadiene include Shell 1220 manufactured by Shell Chemical, Neocis BR40 manufactured by Enichem Elastomers, and Ubepol BR150 manufactured by Ube Industries, Ltd. If desired, the polybutadiene can also be mixed with other elastomers known in the art, such as natural rubber, styrene butadiene, and/or isoprene in order to further modify the properties of the polymer.

The crosslinking agent is typically present in the polymeric component in an amount of about 10 to about 50 parts by weight, based on 100 parts by weight of polybutadiene or, if a mixture of elastomers is used, based on 100 parts by weight of the total elastomer mixture. Crosslinking agents are typically metal salt diacrylates, dimethacrylates, or monomethacrylates. The metal ion can be magnesium, calcium, zinc, aluminum, sodium, lithium or nickel. A preferred cross-linking agent is zinc diacrylate, as it provides golf balls with a high initial velocity. Suitable commercially available zinc diacrylates include those from Sartomer.

A preferred polymeric component based on a thermoset formulation includes a free radical initiator. Free radical initiators are used to promote cross-linking of the metal salt diacrylate, dimethacrylate, or monomethacrylate and the polybutadiene. The radical initiator can be any known polymerization initiator which decomposes during the cure cycle. Suitable initiators include organic peroxides, such as dicumyl peroxide, 1,1-di(t-butylperoxy)-3,3,5-trimethyl cyclohexane, 2,5-dimethyl-2,5-di(t-butylperoxy) hexane, a-a-bis(t-butylperoxy) diisopropyl benzene, or di-t-butyl peroxide, and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of polybutadiene or polybutadiene mixed with one or more other elastomers. More preferably, the amount of initiator added ranges between about 0.15 and 2 pph, and most preferably between about 0.25 and 1.5 pph.

The polymeric component can further include additional materials well-known in the art, such as fillers. Fillers can be any compound or composition that can be added to the elastomeric composition to adjust the density and other properties of the core. Suitable fillers include zinc oxide, barium sulfate, and "regrind" (the recycled core molding matrix ground to a particle size appropriate for incorporation into the core compound). The amount and type of filler utilized is governed by the amount and weight of other ingredients in the composition, since a maximum golf ball weight of 1.620 ounces (45.92 g) has been established by the USGA. Appropriate fillers generally used range in specific gravity from about 2.0 to 5.6.

Antioxidants may also be included in the multi-layered cores produced according to the present invention. Antioxidants are compounds which prevent breakdown of the elastomer. Antioxidants useful in the present invention include, but are not limited to, quinoline type antioxidants, amine type antioxidants, and phenolic type antioxidants.

Other ingredients such as accelerators, e.g. tetramethylthiuram, processing aids, processing oils, plasticizers, dyes and pigments, as well as other additives well known to the skilled artisan may also be used in the present invention in amounts sufficient to achieve the purpose for which they are typically used.

In a particularly preferred embodiment, the polymeric component comprises, in amounts based upon 100 parts of polybutadiene, 1,4-polybutadiene with a cis-content of at least 96%, 10–50 pph of a zinc diacrylate cross-linking agent, 0.25–1.5 pph of a radical initiator, and a sufficient amount of a filler or fillers to give the golf ball core the desired density.

Referring again to FIG. 3, in step 101 the polymeric component is provided. Typically, the polymeric component is provided in the form of cylindrical pieces ("preforms"), for example cylindrical sections cut from a cylindrical rod of polymeric material.

In steps 102 and 103, the polymeric component is made pliable by heating and shaped to form a first hemispherical shell. The heating and shaping can be carried out using any known technique such as injection molding or compression molding.

Figure 4:
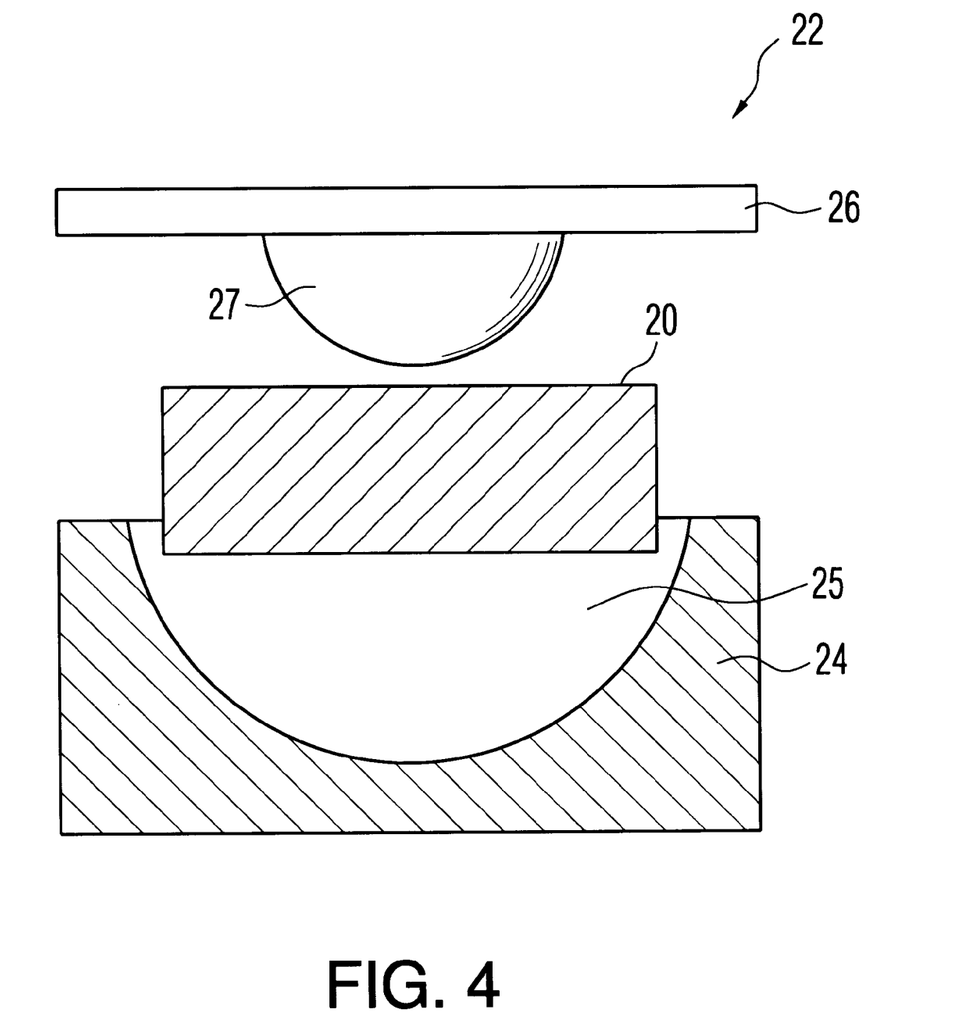
FIG. 4 is a cross-section of a mold for forming a hemispherical shell.

The polymeric component can be heated and shaped in a mold such as the mold shown in FIG. 4 and discussed in detail below. The polymeric component can be heated before, after, or both before and after, placing it in the mold. Preferably, the polymeric component is placed in a mold and made pliable by heating the mold, and such heating can be done by any conventional method, e.g., using steam, resistive heating, etc., such that the polymeric component is sufficiently pliable to be shaped and formed.

The heating step 102 is not intended to cure or to partially cure the polymeric component, so the temperature must be kept below the temperature at which curing begins to take place (the cure initiation temperature) if a thermoset formulation is used. Thus, to be made pliable, the polymeric component is heated to a temperature high enough to allow the polymeric component to be formed into a hemispherical shell, but not so high as to initiate the curing process. One of ordinary skill in the art can readily determine the appropriate temperature range, depending on the particular polymer, cross-linking agent, and radical initiator present. For typical polymeric components, a temperature sufficient to melt the polymeric component but not to initiate curing will be between about 150° F. and 250° F., preferably between about 180° F. and 220° F., and most preferably about 200° F.

The mold can also be pre-heated before placing the polymeric component into the cavities. Pre-heating is advantageous to reduce processing times, and is preferred. In a preferred embodiment, the mold is preheated to a temperature of about 200° F. Advantageously, the polymeric component can be provided at a temperature above room temperature but below the temperature at which it becomes pliable, when it is placed into the pre-heated mold, thus decreasing the mold heating time and increasing the production speed.

Figure 5:
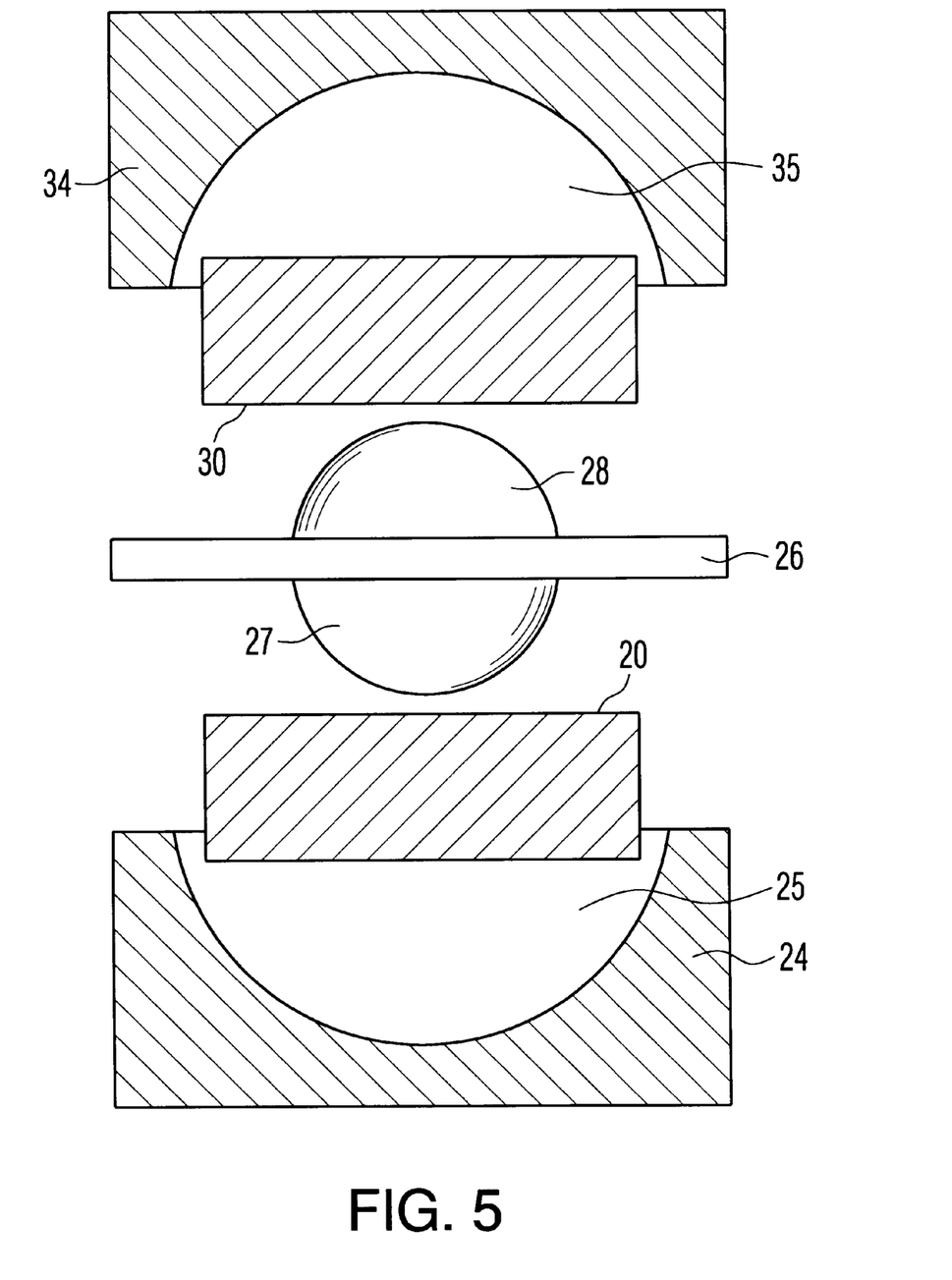
FIG. 5 is a cross-section of a mold for forming two hemispherical shells.

In step 103 of FIG. 3, the polymeric component is shaped to form a first hemispherical shell. Preferably the shaping is done by compression molding. Referring to FIG. 4, to compression mold a shell a polymeric component 20 is compressed in a mold 22 between a concave mold part 24 having a hemispherical cavity 25, and a protrusive mold part 26 having a hemispherical protrusion 27 that can be faced toward the hemispherical cavity 25 and protrude into the cavity when the mold is closed, thereby shaping the polymeric component 20 to form a hemispherical shell. The diameter of the protrusion 27 should be smaller than the diameter of the cavity 25, with the difference in diameters determining the thickness of the shell to be formed. The mold can be any mold suitable for heating and shaping the polymeric component, and can be a discrete mold having a single cavity, as shown in FIG. 4, or a larger mold assembly having a plurality of cavities and protrusions. Referring to FIG. 5, the mold may alternatively have a protrusive mold part 26 having first and second protrusions 27 and 28 on opposite sides, and first and second concave parts 24 and 34 having corresponding hemispherical cavities 25 and 35. In this embodiment, polymeric components 20 and 30 can be simultaneously or sequentially molded in first and second cavities 25 and 35, if desired.

The mold cavity 25 has a diameter approximately equal to the desired outer diameter of the shell to be formed, and the protrusion 27 has a diameter approximately equal to the inner diameter of the shell. The diameter of the mold cavity 25 is typically between about 1.0 and about 2.5 inches to produce a multi-layered core having a diameter of about 1.0 to about 2.5 inches. When a multi-layered core for use in a conventional size golf ball is desired, the multi-layered core preferably has a diameter of about 1.50 to 1.58 inches, depending on the desired thickness of the golf ball cover. Typically, the multi-layered core will have a diameter of about 1.58 inches, although it should be understood that the diameter of the core can be smaller or larger, as desired.

A multi-layered core produced according to this invention can comprise a golf ball center and one or more outer layers. For a multi-layered core with an overall diameter of 1.58 inches and a single outer layer, such as layer 14 in FIG. 1, the golf ball center 12 has a diameter of about 0.8 to 1.5 inches, and the outer layer 14 has a thickness of about 0.04 to 0.39 inches. Preferably, the golf ball center 12 has a diameter of about 1.0 to 1.2 inches, and the outer layer 14 of the multi-layer core has a thickness of about 0.190 to 0.29 inches. Accordingly, the diameter of the mold cavity 25 or 35 preferably is about 1.58 inches, and the diameter of the protrusion 27 or 28 is about 1.0 to about 1.2 inches.

When two or more outer layers are used, as in layers 14a and 14b in FIG. 2, the mold dimensions are adjusted accordingly. The thickness of each of the outer layers 14a and 14b can be chosen as desired, depending on the nature of the layer material and the desired characteristics. The diameter of each outer layer, and the corresponding diameter of the mold cavity 25 or 35 and protrusion 27 or 28 used to produce the layer, is readily determined based on the diameter of the golf ball center 12, the overall multi-layered core diameter, and the desired thickness of the layer.

For example, a two-outer-layer multi-layered core such as shown in FIG. 2 typically has an innermost outer layer 14b with a thickness of about 0.115 inches, and an outermost outer layer 14a with a thickness of about 0.1 inches. In one embodiment of a two-outer-layer multi-layered core with an overall diameter of 1.58 inches, and referring to FIGS. 2 and 4, the golf ball center 12 has a diameter of about 1.15 inches, the mold cavity 25 has a diameter of about 1.38 inches and the protrusion 27 has a diameter of about 1.15 inches, to form the hemispherical shell for a 0.115 inch thick innermost outer layer 14b. To form the shell for the outermost outer layer 14a, the mold cavity 25 has a diameter of about 1.58 inches and the protrusion 27 has a diameter of about 1.38 inches, to form the hemispherical shell for a 0.1 inch thick outermost outer layer 14a.

As a further example, a multi-layered core with three outer layers can have a golf ball center with a diameter of about 1.0 inches; an innermost outer layer with a thickness of about 0.075 inches (diameter 1.15 inches); a middle outer layer with a thickness of about 0.175 inches (diameter 1.5 inches); and an outermost outer layer with a thickness of about 0.04 inches (diameter 1.58 inches). It should be understood that the process may be used for the preparation of any number of layers in the multi-layered core, with dimensions and thicknesses adjusted as desired.

The mold cavity 25 or 35 can be of any shape suitable to make a hemispherical shell, and may be hemispherical, elliptical, etc. It is known in the art to have a mold cavity that may contain various deviations from a perfectly hemispherical shape in order to better accommodate polymer flow during the molding process. By "hemispherical" is meant not only a perfectly hemispherical shape, but also shapes that are slightly elliptical or otherwise deviate from perfectly hemispherical, as is well-known in the art.

Referring again to FIG. 3, in step 104 the hemispherical shell is stiffened by cooling to increase its rigidity. As used herein, the term "stiffened" means that the shell is cooled a temperature low enough so that the hemispherical shell maintains its shape. Such temperature is typically less than about 45° F. Lower temperatures may also be used, as the shell is more rigid at lower temperature. At temperatures below about −100° F., the shell is expected to exhibit crystalline or quasi-crystalline behavior, and become undesirably brittle. Thus, the shells can be stiffened by cooling to between about −100° F. and about 45° F. Preferably, the shells are cooled to between about 0° F. and about 45° F.

In order to resist deformation in subsequent processing steps, the temperature of the hemispherical shell must be low enough to give it sufficient rigidity to be handled and to maintain its shape; i.e., sufficient rigidity to resist its natural tendency to return to its original shape. The degree of rigidity necessary depends in part on the manner in which the shell is handled in the subsequent steps of the process to form a multi-layered core. At a minimum, at least an inner surface of the shell is stiffened by cooling to a temperature sufficiently low to allow the inner surface to resist deformation when the spherical core is placed in the shell. Preferably, the inner and outer surfaces both are stiffened by cooling, and most preferably, the entire shell is cooled.

The stiffness of the shell can be measured using a rheometer. Using this measure, the shell must be cooled to a temperature such that the viscosity is at least about $5 \times 10^5$ poise, and preferably at least about $6 \times 10^5$ poise. An alternative measure of the shell rigidity is the stiffness parameter, G'. Using this measure, the shell should have a stiffness of at least about $2.6 \times 10^6$ dyne/cm$^2$, and preferably at least about $2.9 \times 10^6$ dyne/cm$^2$. In a particular example, the viscosity was determined using a Rheometrics rheometer in a parallel plate mode, using 25 mm separated plates. A frequency sweep was performed at 0° C. and 22° C., plotting the shear storage modulus and the complex viscosity. A temperature sweep from 0° C. to 22° C. was also performed with the frequency held at 1 Hz. The G', G" and Tan Delta were also plotted to view how the core stock stiffness changes with temperature. These measurements showed that the core stiffness increases at lower temperature.

The shell can be cooled by any suitable means, such as by placing the mold in a cold compartment, or exposing the mold to a chilled liquid. Preferably, the shell is cooled while still disposed between the mold cavity 25 and the protrusion 27 in the closed mold. It is particularly advantageous to cool the shell quickly, and a preferred method is to cool the mold by circulating a chilled liquid in channels provided in the mold. In a typical embodiment, the shell is stiffened by cooling to a temperature of less than about 45° F. by circulating water through the molds. Other suitable liquids known in the art can be used to cool the shell to still lower temperatures if desired. For example, chilled ethylene glycol or an aqueous ethylene glycol solution can be used to cool the shell to temperatures below 32° F. If a circulating liquid is used to cool the mold, it may also be desirable to change the temperature of the liquid during the cooling process, either continuously or in a plurality of steps, to reduce the possibility of cracking the molds. For example, if the mold is heated to about 200° F. to melt and mold the polymeric component, it may be desirable to cool the mold by first using a hot liquid (e.g., hot water) and then using progressively cooler liquids (e.g., warm water, cool water, etc.) as the mold cools down.

The mold is preferably maintained at the temperature used to stiffen the shell for a period of time sufficient to allow the temperature of the hemispherical shell to reach the mold temperature. Generally the mold will cool more quickly than the hemispherical shells. The amount of time necessary to allow sufficient cooling will vary with the heat transfer characteristics of the mold, the hemispherical shell, and the coolant, and will also depend upon the desired temperature. When the desired temperature is about 45° F. and the coolant is at a temperature of about 45° F., the time necessary to sufficiently cool the shell is preferably at least about one minute, and more preferably at least about 3 minutes. Of course, different coolant temperatures and flow rates will result in varying cooling times to sufficiently stiffen the shell, which will be readily apparent to one of ordinary skill in the art. The hemispherical shell can be held at this temperature or at a lower temperature, if desired, for several hours or longer, without any adverse consequences expected.

In step 105, a second hemispherical shell is provided. The second shell can be any hemispherical shell suitable for joining to the first hemispherical shell around a spherical core. The second shell is preferably a shell produced by the present method and essentially the same as the first shell. Preferably, the second shell is also stiffened by cooling.

Figure 6:
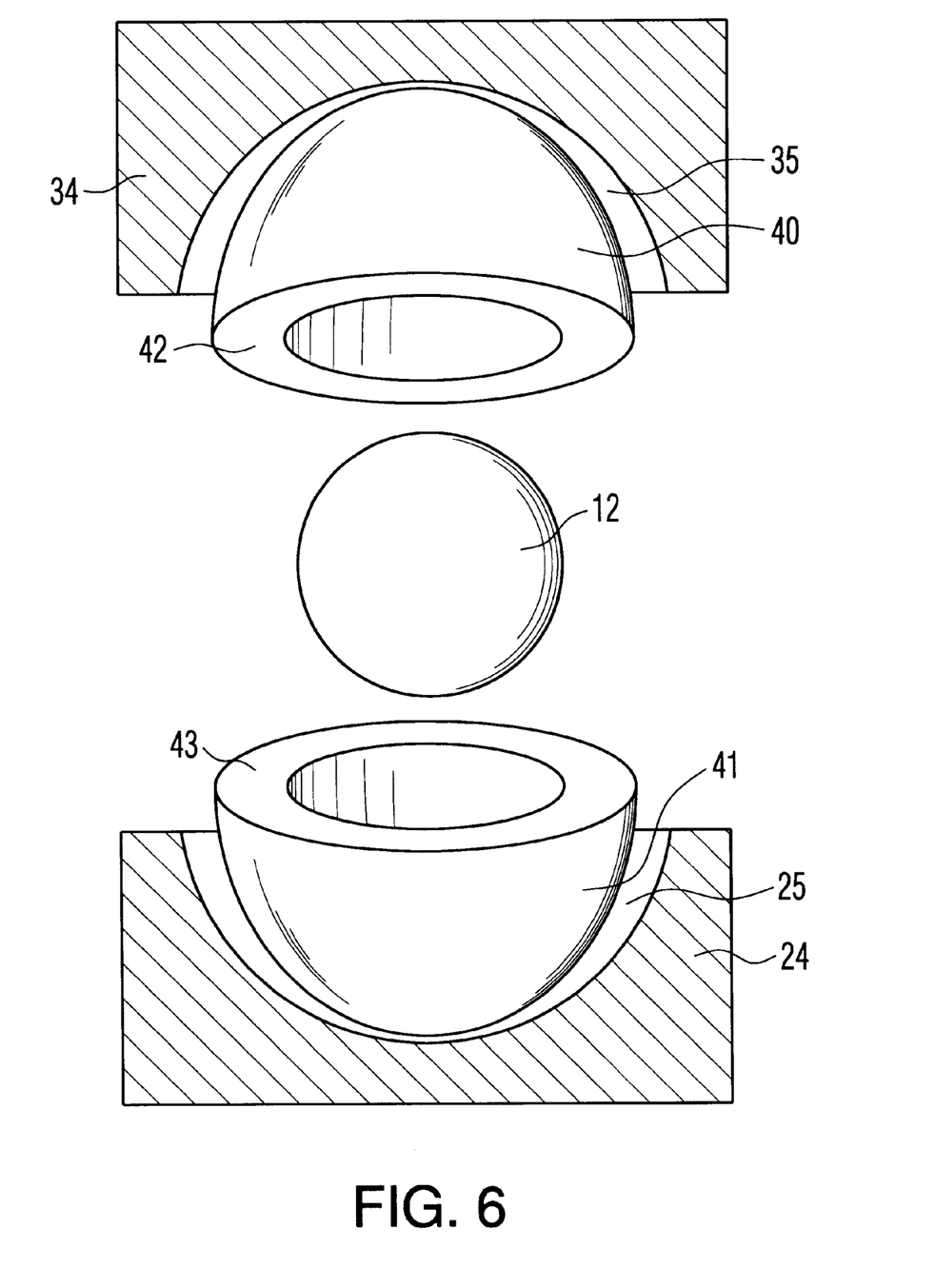
FIG. 6 depicts a process for assembling two hemispherical shells around a ball center to form a multi-layered core having one core outer layer.

In step 106, the first and second shells are assembled around a spherical core. To produce a multi-layered core having a single core outer layer, the spherical core is a golf ball center. Referring to FIG. 6, the first and second hemispherical shells 40 and 41 having flat equatorial surfaces 42 and 43 are assembled around ball center 12. The ball center 12 is preferably a solid polybutadiene-based center that is formed by compression molding the polybutadiene material as is well know in the art. The ball center 12 can also be filled with a fluid, preferably a liquid. Liquid filled centers are also well known in the art for wound balls, and are typically manufactured by forming a shell, filling it with the desired liquid by needle injection, and then patching the injection hole. The shells 40 and 41 are formed over the center 12 and the core is compression molded. In a preferred method, the shells are compression molded in the same mold-halves 24 and 34 that formed the shells or they are compression molded in a different mold.

Figure 7:
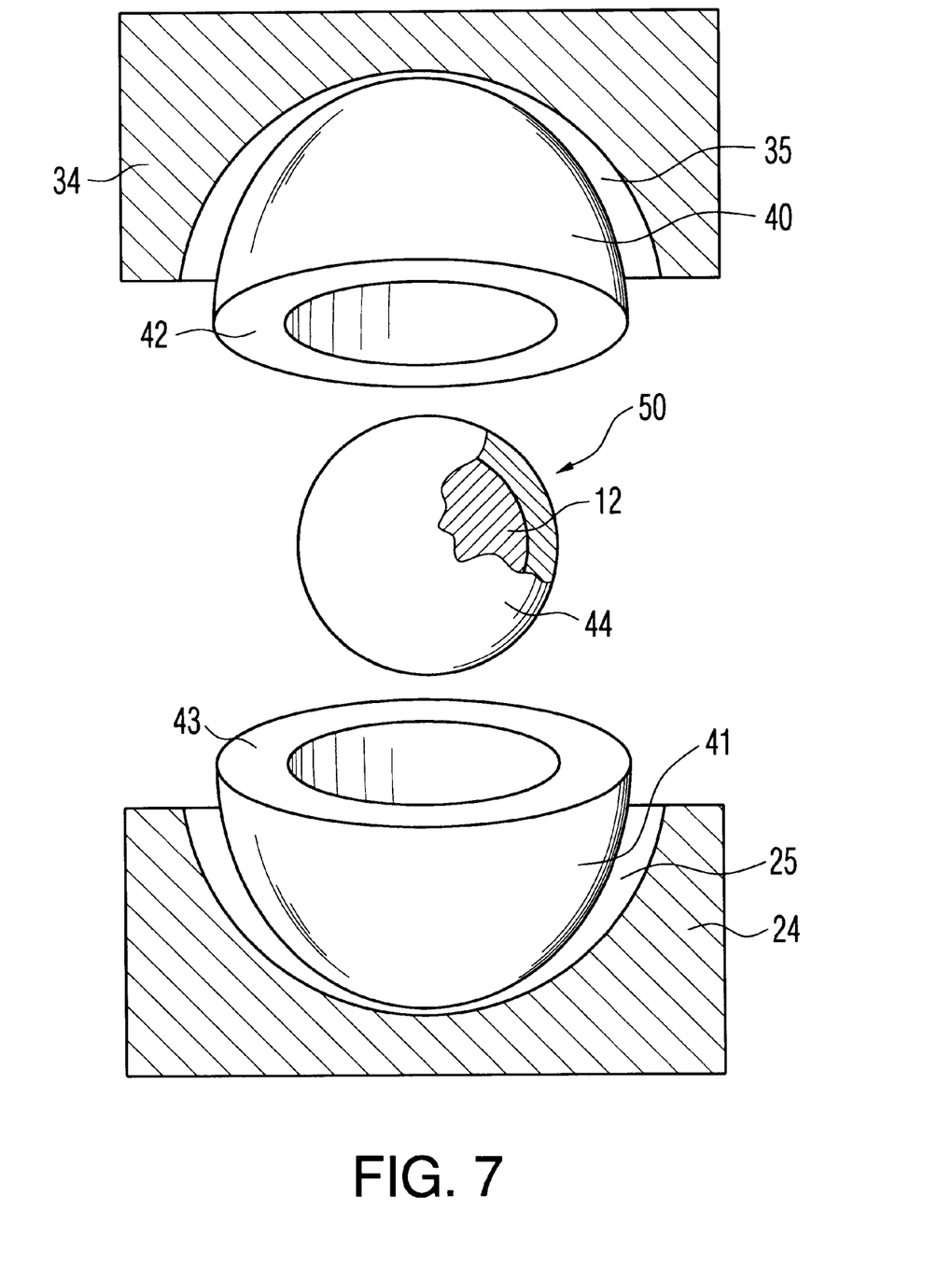
FIG. 7 depicts a process for assembling two hemispherical shells around a spherical core to form a multi-layered core having two or more core outer layers.

To produce a multi-layered core having two or more core outer layers, the spherical core may itself be a multi-layered core. Referring to FIG. 7, a spherical core 50 is shown having a ball center 12 and a spherical outer layer 44. Preferably, the spherical core 50 is itself a multi-layered core and made according to the present invention. Thus, a multi-layered center can be produced according to the present invention, and subsequently used as the spherical center to form the multi-layered core of the present invention. In FIG. 7, the first and second hemispherical shells 40 and 41 are assembled around spherical core 50. The shells 40 and 41 are then compression molded over the center 50 by heating the shells to a temperature greater than the cure initiation temperature and applying pressure. In a preferred method, the core is molded in the same mold-halves 34 and 24 that the shells were formed in. Multi-layered cores having still more outer layers are produced in the same fashion.

In step 107 of FIG. 3, the shells are joined to form a multi-layered core. The shells can be joined at the equatorial surfaces 42 and 43 using any known technique such as using an adhesive or compression molding. Preferably, when the core formulation is a thermoset formulation, the shells are joined by compression molding, according to known methods. Typically, compression molding for 10–15 minutes at a temperature of about 330° F. is suitable to produce a finished multi-layered core. The compression molding is carried out at a temperature above the cure initiation temperature of the polymeric component, so that chemical crosslinking occurs during the molding process.

In a particularly preferred embodiment, the assembling step 106 is carried out while the shells are still in the mold, and in the joining step 107 the shells are joined by compression molding around the spherical core, while still in the same mold.

Alternatively, the shells can be removed from the mold cavities prior to the assembling step, and assembled and compression molded in one or more additional molds such as are known in the art. The cooled hemispherical shells are sufficiently rigid that they can be removed from the mold cavities and will maintain their shape without significant deformation. The hemispherical shells are removed from the mold cavities while still cold, to maintain their rigidity, and are preferably maintained at a sufficiently low temperature until assembled around the spherical core, and more preferably until the final compression molding step to prevent undesirable deformation and resultant reduction of centering precision. In addition, it is advantageous to complete the process to produce a finished multi-layered core quickly after the hemispherical shells are removed from the mold cavities. Thus, the shells preferably are still cold when two shells are assembled around a spherical core, placed into a final mold, and compression molded to produce a finished multi-layered core. The final mold preferably is kept cold at or below about 45° F. until the compression molding step is begun. Thus, the hemispherical shells and the multi-layered core assembled therefrom are kept at a temperature of less than about 45° F., from a time before they are removed from the mold cavities until a time after they are assembled around a spherical core and placed into the final core mold.

These and other aspects of the invention may be more fully understood with reference to the following non-limiting example, which is merely illustrative of the preferred embodiment of the present invention, and is not to be construed as limiting the invention, the scope of which is defined by the appended claims.

EXAMPLE

Hemispherical shells are formed and compression molded around a golf ball center, according to the method of the present invention. The core and shell compositions are shown in Table 1.

TABLE 1

Core and Shell Compositions

| Component | Core Composition PHR | Core Composition grams | Shell Composition PHR | Shell Composition grams |
|---|---|---|---|---|
| Polybutadiene | 100.00 | 192.02 | 100.00 | 178.77 |
| Zinc Diacrylate | 18.00 | 34.56 | 36.00 | 64.36 |
| DBDB 60* | 0.00 | 0.00 | 0.15 | 0.27 |
| Coloring | 0.25 | 0.48 | 0.25 | 0.45 |
| Varox 802-40KE-HP** | 0.81 | 1.56 | 0.00 | 0.00 |
| Varox 231 XL** | 0.00 | 0.00 | 0.42 | 0.75 |
| Zinc Oxide | 28.35 | 54.44 | 21.51 | 38.45 |
| Total: | | 283.05 | | 283.04 |
| Specific Gravity | | 1.1600 | | 1.1600 |

*dicumyl peroxide on a filler; available from Elastochem
**peroxides; available from Vanderbilt The polymeric component is hot stock (180° F.) and is placed in mold cavities preheated to about 180° F. for about 2 minutes, then molded to form hemispherical shells with an outer diameter of about 1.58 inches and an inner diameter of 1.15 inches. The molds are then cooled to about 45° F. using circulating chilled water for about 7 minutes. At this point, the hemispherical shells are optionally removed from the mold, and assembled around a center formed to a diameter of 1.15 inches. Alternatively, the hemispherical shells may be assembled around a golf ball center while still in the molds. The multi-layer core assembly is then compression molded at about 330° F. to form a finished multi-layer core with a diameter of about 1.58 inches.

What is claimed is:

1. A method of forming a multi-layered core with improved centering of a spherical core, which comprises:

providing an uncured polymeric component having a cure initiation temperature;

making the uncured polymeric component pliable by heating to a first temperature below the cure initiation temperature;

shaping the uncured polymeric component to form a plurality of uncured shells, each uncured shell having a hemispherical shape;

cooling each uncured shell to a second temperature such that the uncured shell is sufficiently rigid to maintain the hemispherical shape and resist deformation upon assembly with the spherical core;

assembling two cooled, uncured shells around the spherical core; and joining the assembled cooled, uncured shells and the spherical core to form a multi-layered core by heating the shells to a temperature greater than the cure initation temperature.

2. The method of claim 1, wherein the polymeric component comprises at least one of polybutadiene, natural rubber, isoprene, or styrene butadiene.

3. The method of claim 2, wherein the first temperature is about 180° F. to about 220° F.

4. The method of claim 2, wherein the joining step comprises compression molding assembled cooled, uncured shells and the spherical core at a curing temperature greater than the cure initiation temperature to cure the shells.

5. The method of claim 1, which further comprises forming a cover about the multi-layered core.

6. The method of claim 1, wherein the first shell has a viscosity of at least about 500,000 poise at the second temperature.

7. The method of claim 1, wherein the first shell has a stiffness of at least about $2.6 \times 10^6$ dyne/cm$^2$ at the second temperature.

8. The method of claim 1, wherein the second temperature is about −100° F. to about 45° F.

9. The method of claim 1, wherein the second temperature is about 0° F. to about 45° F.

10. The method of claim 1, wherein the spherical core comprises a fluid-filled or solid ball center.

11. The method of claim 10, wherein the fluid is a liquid.

12. The method of claim 9, wherein the spherical core further comprises a spherical center and at least one layer disposed about the center.

13. A method of forming a multi-layered core with improved centering of a spherical core, which comprises:

providing an uncured polymeric component having a cure initiation temperature;

making the uncured polymeric component pliable by heating to a first temperature below the cure initiation temperature;

shaping the uncured polymeric component to form a plurality of uncured shells, each uncured shell having a hemispherical shape;

cooling each uncured shell to a second temperature such that the uncured shell is sufficiently rigid to maintain the hemispherical shape and resist deformation upon assembly with the spherical core;

compression molding the assembled two cooled, uncured shells and the spherical core at a curing temperature greater than the cure initiation temperature to cure the cooled, uncured shells, thereby forming a multi-layered core.

14. The method of claim 13, which further comprises forming a cover about the multi-layered core.

15. The method of claim 13, wherein the first temperature is about 180° F. to about 220° F.

16. The method of claim 13, wherein the first temperature is about 190° F. to about 210° F.

17. The method of claim 13, wherein the first shell has a viscosity of at least about 500,000 poise at the second temperature.

18. The method of claim 13, wherein the first shell has a stiffness of at least about $2.6 \times 10^6$ dyne/cm$^2$ at the second temperature.

19. The method of claim 13, wherein the second temperature is about −100° F. to about 45° F.

20. The method of claim 13, wherein the second temperature is about 0° C. to about 45° F.

21. The method of claim 13, wherein the spherical core comprises a fluid-filled or solid ball center.

22. The method of claim 21, wherein the fluid is a liquid.

23. The method of claim 21, wherein the spherical core further comprises a spherical center and at least one layer disposed about the center.

24. The method of claim 1, wherein the polymeric component further comprises at least one of a crosslinking agent or a free radical initiator.

25. The method of claim 13, wherein the polymeric component further comprises at least one of a crosslinking agent or a free radical initiator.

* * * * *

UNITED STATES PATENT AND TRADEMARK OFFICE
CERTIFICATE OF CORRECTION

PATENT NO. : 6,207,095 B1
DATED : March 27, 2001
INVENTOR(S) : Steven M. Gosetti It is certified that error appears in the above-identified patent and that said Letters Patent is hereby corrected as shown below:

Column 11, claim 1,
Line 18, insert after "temperature" the words -- that is --.

Column 12, claim 12,
Line 2, delete "claim 9" and insert -- claim 10 --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*